United States Patent [19]
Urry

[11] Patent Number: 6,022,639
[45] Date of Patent: Feb. 8, 2000

[54] ZINC ANODE FOR AN ELECTOCHEMICAL CELL

[75] Inventor: Lewis F. Urry, Elyria, Ohio

[73] Assignee: Eveready Battery Company, Inc., St. Louis, Mo.

[21] Appl. No.: 08/742,547

[22] Filed: Nov. 1, 1996

[51] Int. Cl.[7] ................................................. H01M 4/42
[52] U.S. Cl. .......................................................... 429/229
[58] Field of Search ............................................. 429/229

[56] References Cited

U.S. PATENT DOCUMENTS

| | | | |
|---|---|---|---|
| 4,215,084 | 7/1980 | Maringer | 264/8 |
| 4,242,069 | 12/1980 | Maringer | 425/8 |
| 4,743,185 | 5/1988 | Vu et al. | 419/23 |
| 5,198,315 | 3/1993 | Tada et al. | 429/229 X |
| 5,283,139 | 2/1994 | Newman et al. | 429/229 X |
| 5,348,816 | 9/1994 | Shinoda et al. | 429/229 X |
| 5,384,214 | 1/1995 | Sugihara et al. | 429/229 X |

FOREIGN PATENT DOCUMENTS

| | | |
|---|---|---|
| 0 555 978 | 8/1993 | European Pat. Off. . |
| 61-096665 | 5/1986 | Japan . |
| 7254406 | 10/1995 | Japan .................. H01M 4/06 |
| 2028569A | 3/1980 | United Kingdom . |

*Primary Examiner*—Stephen Kalafut
*Attorney, Agent, or Firm*—Michael C. Pophal; Robert W. Welsh

[57] ABSTRACT

An electrochemical cell having a zinc anode comprising zinc flakes.

21 Claims, 5 Drawing Sheets

ZINC FLAKES

ZINC POWDER

ZINC FLAKES 6,022,639

ZINC ANODE FOR AN ELECTROCHEMICAL CELL

FIELD OF THE INVENTION

This invention relates to zinc anodes for electrochemical cells, particularly aqueous alkaline electrochemical cells, and more particularly to zinc anodes comprising zinc flakes.

BACKGROUND OF THE INVENTION

Alkaline cells have added mercury to the zinc anode to enhance current collecting effect by increasing contacts between zinc particles per se, and between zinc particles and current collectors. However, when mercury was removed from the zinc due to environmental concerns, performance and quality decreased. Basically, removing mercury from alkaline batteries impaired its leakproof characteristics, shock resistance characteristics, and discharge characteristics.

Many different approaches have been undertaken to overcome these problems. To alleviate the leakage problems associated with hydrogen gas generation, zinc alloy powders were produced with the addition of new metallic elements such as indium, bismuth, lead, aluminum and others. The problems of shock and vibration sensitivity were improved by the addition of gelling agents to the anode (such as carboxymethylcellulose, sodium polyacrylate, polyacrylic acid, for example). The gelling agents act to improve and increase contact points and firmness of the zinc particles. By using these gelling agents, the viscosity of the gel negative electrode increases to suppress the movement of the zinc particles. For example, European Patent EP 678927 teaches the use of three crosslinked gelling agents in combination for inhibiting vibration and improving shock resistance. This can impair discharge characteristics due to a poor reaction efficiency of the zinc and due to a reduction in electrical capacity ratio. Japanese published application JP 7-254405 teaches using a gelled negative electrode comprising non-amalgamated zinc powder in the shape of balls and long slender elements to increase contact points for improved dischargeability and flowability of the anode gel.

Due to the limited size of a battery's internal volume, battery manufacturers have been limited to the amount of active materials that can be packed into the cell. In order to provide the maximum electrochemical activity and a minimum of limiting polarization, it is desirable to operate a battery at as low a current density on the active materials as possible while still producing the required amount of total current from the system. Accordingly, alkaline batteries conventionally employ electrodes made from powdered active materials so as to obtain the highest possible surface area per unit weight or volume and thus minimize current density. The minimum amount of zinc powder in the anode needed to efficiently match the cathode's electrochemical potential has been about no less than 28 volume percent. Using higher amounts of zinc would unnecessarily waste zinc and restrict space around each zinc particle which limits the cell's solid reaction product capacity. The higher zinc content can therefore result in a decreased high rate service performance. Using lower amounts of zinc powders results in decreased electrochemical output and decreased voltage stability due to insufficient particle-to-particle and particle-to-collector contact.

Referring now to FIG. 1, conventional zinc powders used for alkaline batteries are shown as irregularly shaped particles, ranging from lumpy or distorted spheroids, to elongated tuberous forms. These particles frequently possess craggy, or minor protrusions, and irregular surface characteristics. The average surface area of these particles can be about 37 $cm^2$ per gram of zinc. A particle's dimensions can be described in a three-dimensional system by its length, width, depth, thickness, and span dimensions. The span is most necessarily the same magnitude or orientation as the length. The aspect ratio of any particle is the ratio of its span to its width. The depth determines the minimum size sieve opening through which the particle will pass. The depth is not necessarily perpendicular to either the span or the length. For a typical battery grade zinc powder, the median depth, is determined by sieving, is approximately 100 to 300 microns; however, the extremes range from 20 microns to 1000 microns. Typical powders, as analyzed by scanning electron microscopy, have a depth that is nearly the same as the width and have aspect ratios of approximately 2 (i.e., the particles are near spherical to elongated shapes). In conventional zinc powders, the ratio of the largest to the smallest lateral dimension is typically between about 1:1 to 10:1.

Nonetheless, until now, use of conventional zinc powders has required no less than 28 volume percent of zinc in the anode to provide sufficient electronic conductivity. Accordingly, it is desirable to have a zinc anode that enables significantly lower amounts of zinc to be used in the anode, while still maintaining an adequate current carrying matrix while maintaining good conductivity, improved high current discharge efficiency, and solves the problem of shock and vibration sensitivity.

SUMMARY OF THE INVENTION

The present invention is an electrochemical cell having a zinc anode comprising zinc flakes.

In another aspect, this invention is an electrochemical cell having a zinc anode comprising a combination of zinc flakes and zinc powder.

In yet another aspect, this invention is an electrochemical cell comprising a zinc anode, said zinc anode having a zinc concentration less than 28 percent by volume of the anode.

In still another aspect of this invention is an electrochemical cell comprising a zinc anode gel, said zinc anode gel having a zinc content of from about 0.36 grams of zinc per $cm^3$ of anode gel volume to about 1.56 grams of zinc per $cm^3$ of anode gel volume.

DETAILED DESCRIPTION OF THE INVENTION

Figure 1:
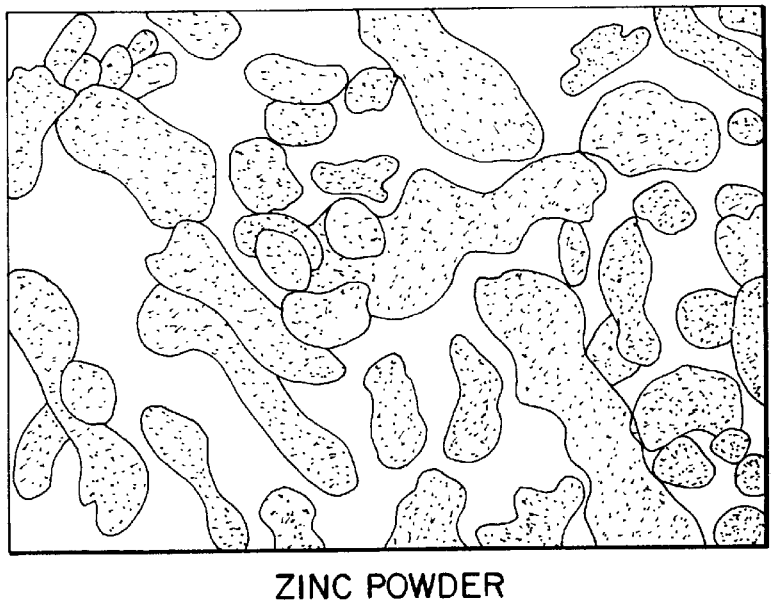
FIG. 1 is an electron photomicrograph of conventional zinc powder, as used in aqueous alkaline cells, showing the characteristically irregular particle shapes and sizes.
Figure 2:
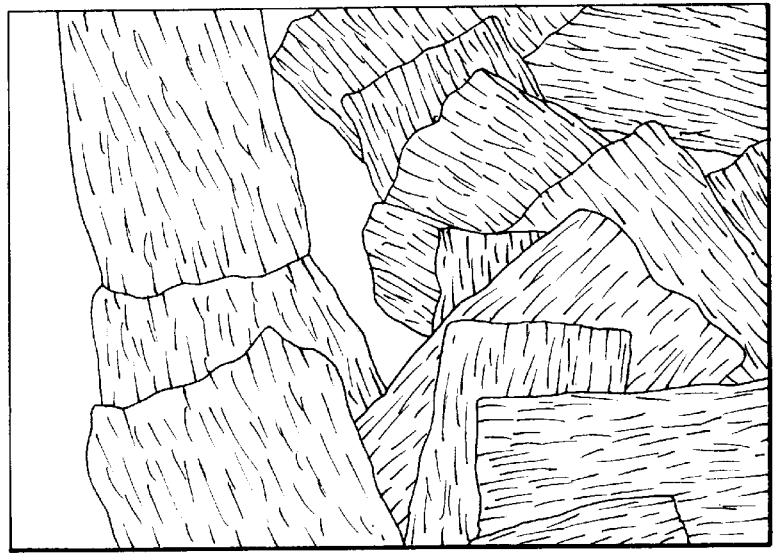
FIG. 2 is an electron photomicrograph of zinc flakes as used in this invention.

Referring now to FIG. 2, there is shown zinc flakes typical of those of the present invention. The flake is defined as a relatively small, thin particle having high surface area per gram, with a thickness, length, and width dimension. The thickness is substantially smaller than any other dimension. The flakes can have varying shapes, such as scale-like or chip-like layers of zinc, having various geometries such as discs, squares, troughs, triangles, rhomboids, rectangles, and the like. The zinc flakes may also have various configurations. For example, the flakes can be flat, bent, curled, or otherwise shaped or configured. The desired configurations can be selected based on processability or other optimizing characteristics. Typically, the thickness of the flakes is at least 10 times smaller, and preferably at least 20 times smaller, than the next smallest dimension of either width or length. In practice, largely to maintain the ability of a bed of such particles to flow, the ratio of the next smallest dimension to the thickness is preferably in the range of about 20:1. More preferable is a thinner particle having a ratio of 40:1. For the most preferred particle, being the thinnest particle for the best current density, the ratio can be about 80:1. Zinc flakes having ratios greater than 80:1, however, are not as desired for flowability. Typically, the zinc flakes can have thicknesses of 0.001 inch, with average length of 0.024 inch and width of, e.g., 0.024 to 0.040 inch.

The average surface area of flakes can range from about 30 $cm^2$ to about 150 $cm^2$ per gram. The flakes used in this invention preferably have an average surface area of 121 $cm^2$ per gram of zinc; thus, the surface area for flakes can be on the average of a 300% increase per gram compared to typical powders, providing for good contact mechanism. Increasing the surface area in this magnitude lowers the current density to one-third for the same input of zinc. Surface areas of flakes can be measured by scanning electron microscopy. The tap density of the zinc flakes in this invention is 0.82 g/cc, as compared to 3.05 g/cc for conventional zinc powders. Table 1 shows tap density, average thickness, and average surface area comparisons of conventional zinc powders (and other zinc forms known in the art) to zinc flakes of this invention.

TABLE 1

| Material | Tap density (gm/cc) | Thickness (microns) | Surface Area ($cm^2$/gm) |
| --- | --- | --- | --- |
| Flakes | 0.82 | 25 | 121.3 |
| 1230 Zinc Powder | 3.05 | 180 | 37.0 |
| Needles | 3.19 | 320 | 19.7 |
| Spheres | 4.23 | 316 | 26.6 |

The flake materials in this invention can be obtained from available sources, or may be manufactured using processes described in U.S. Pat. Nos. 4,154,284, 4,242,069, and U.S. Pat. No. 4,215,084, incorporated herein by reference.

The zinc flakes can be comprised of pure zinc, or zinc alloys such as bismuth—indium—calcium, bismuth—aluminum, bismuth—indium, bismuth—indium—aluminum, or others. The zinc powder can be independently comprised of pure zinc or a zinc alloy. That is, the zinc powder and the zinc flake need not be made of the same zinc composition. The zinc flakes used in the preferred embodiments are: 500 ppm Pb alloy; bismuth—indium—calcium alloy (bismuth 250 ppm, indium 250 ppm, calcium 150 ppm); or, bismuth—indium—aluminum alloy (bismuth 250 ppm, indium 250 ppm, aluminum 80 ppm), although other alloys are of course feasible. In another preferred embodiment, indium can be coated on the alloys in an amount of 10–500 ppm, preferably between 20–200 ppm.

The anode gel according to this invention is a homogeneous mixture of an aqueous alkaline electrolyte, a gelling agent being composed mainly or solely of a crosslinked polyacrylic acid, and a combination of zinc powder and thin zinc flakes as main components. The aqueous alialine electrolyte can be an alkaline metal hydroxide such as sodium hydroxide, potassium hydroxide, and the like, or mixtures thereof. Potassium hydroxide is preferred. The gelling agent that can be used in this invention can be a crosslinked polyacrylic acid such as Carbopol® 940, carboxymethylcellulose, polyacrylamide, sodium polyacrylate, or other agents that are hydrolyzable in alkaline electrolyte solution. The zinc powder and/or zinc flakes may be pure zinc, or an alloy comprising an appropriate amount of one or more of the metals selected from the group consisting of indium, lead, bismuth, lithium, calcium, aluminum, and the balance being zinc. Any combination of alloy compositions may be used for the powders and flakes. The flakes can be present in an amount between about 5 percent by weight to about 70 percent by weight of the total zinc concentration, with the remainder being conventional zinc powder. The order of addition and the methods of mixing the components are not critical to this invention. Other components such as gassing inhibitors, organic or inorganic anticorrosive agents, binders, surfactants, or others, may be optionally added, simultaneously or separately, directly to the dry zinc mixture, or may alternatively be added to the electrolyte or gelled electrolyte before blending. Examples of gassing inhibitors or anticorrosive agents can include indium salts (such as indium hydroxide), perfluoroalkyl ammonium salts, alkali metal sulfides, etc. Examples of surfactants can include polyethylene oxide, polyoxyethylene alkylethers, perluoroalkyl compounds, and the like.

It has been found that the use of a mixture of zinc flakes and zinc powder presently provides the preferred composition because the mixture in a gel material has better flow characteristics for assembly purposes than just zinc flakes in the gel material. The anode gel using zinc flakes according to this invention has a zinc content as low as 9 volume percent in the anode gel. Presently, a combination zinc ratio of 20% zinc flake80% zinc powder is preferred. The ratio can vary depending on flowability and packability characteristics. Generally, the ratios can also vary based on the particles' shape and configuration. It is desired that the combined ratio will also match the electrochemical potential of the $MnO_2$ in the cathode. Mixtures within the range of from about 5 to about 70 weight percent of the zinc as flake, depending on the shape and the configuration, with the remaining percentage of the zinc as powder, do permit excellent filling of the anode cavity, provide sufficient total zinc and surface-accessible zinc, and support the above-mentioned advantageous results including insensitivity to shock and vibration. In a preferred embodiment, the zinc flakes can comprise about 20 weight percent of the total zinc weight. For levels above 70 weight percent, flowability may be lowered. For concentrations lower than 5 weight percent, surface area and particle-to-particle and particle-to-collector contact may be too low. The zinc content in the anode gel using this invention should be between about 0.36 grams of zinc per $cm^3$ of anode gel volume and 1.56 grams of zinc per $cm^3$ of anode gel volume.

The anode gel can be prepared by (1) mixing a solution of the electrolyte with the zinc—before, after, or concurrently with dissolution of the gel material therein—the zinc flakes comprising about 5 to about 70 weight percent of zinc and the remainder of the zinc in the form of conventional zinc powder, the powder being a mixture of irregularly shaped particles, having particle size distributions ranging from 20–1000 microns and averaging approximately 200 microns, with an aspect ratio range of 1 to 7 and an average aspect ratio range of 2 in the xy, yz and xz vectors; and (2) mixing thoroughly to uniformly incorporate the zinc forms; and then (3) shaping or flowably shaping the resulting anode gel material to form an anode for an electrochemical cell.

In a preferred embodiment of this invention, a zinc anode gel having 25 volume percent zinc can be prepared using a mixture of zinc flakes, zinc powder, potassium hydroxide, and indium hydroxide. The zinc flakes are present at 20 weight percent of the total weight of the combination of zinc powder and zinc flakes, with the remainder being conventional zinc powder (Big River Zinc 1230). Both the flakes and the powder are zinc alloys comprising 500 ppm lead, and are surface-coated or surface-deposited with indium. The zinc combination is mixed with pregelled electrolyte, comprising a combination of 35 weight percent of anode gel of 38.5% aqueous potassium hydroxide, 0.6 weight percent Carbopol® 940, 0.05 weight percent sodium silicate as binder, and 1.0 weight percent zinc oxide.

In another preferred embodiment of this invention, a zinc anode gel having 9 volume percent zinc is prepared using only zinc flakes. The flakes are a zinc alloy comprising 500 ppm lead, and sur-face-coated or deposited with indium. The zinc flakes are mixed with the pregelled electrolyte, comprising about 63 weight percent of 38.5% aqueous potassium hydroxide, 1.1 weight percent Carbopol 940, 0.1 weight percent sodium silicate as binder, and 1.9 weight percent zinc oxide.

EXAMPLE 1

Two test lots of alkaline cells are constructed comparing anode gels made with zinc flakes with control gels made with conventional zinc powders. The test anode gel is made by mixing 9 volume percent zinc flakes, having an average dimension 0.024×0.024×0.001 inch with gelled electrolyte solution. The gelled electrolyte solution comprises about 0.6 weight percent crosslinked polyacrylic acid (Carbopol® 940) and the balance being 38% aqueous potassium hydroxide. The anode volume is measured as the volume enclosed in the space between the inside surface of the separator to the collector, and the inside surface of the separator at the bottom of the anode to the top of the anode. Control AA cells containing 9 volume percent zinc powder in the anode are similarly constructed. The resulting cells are tested for short circuit amperage. Whereas control AA cells have a short circuit amperage of 0.2 Amps, the flake AA cells produce 16 Amps of current. Thus, the cell with the zinc flakes demonstrate a greatly improved current carrying efficiency per gram of zinc over zinc powder anode cells.

EXAMPLE 2

Figure 4:
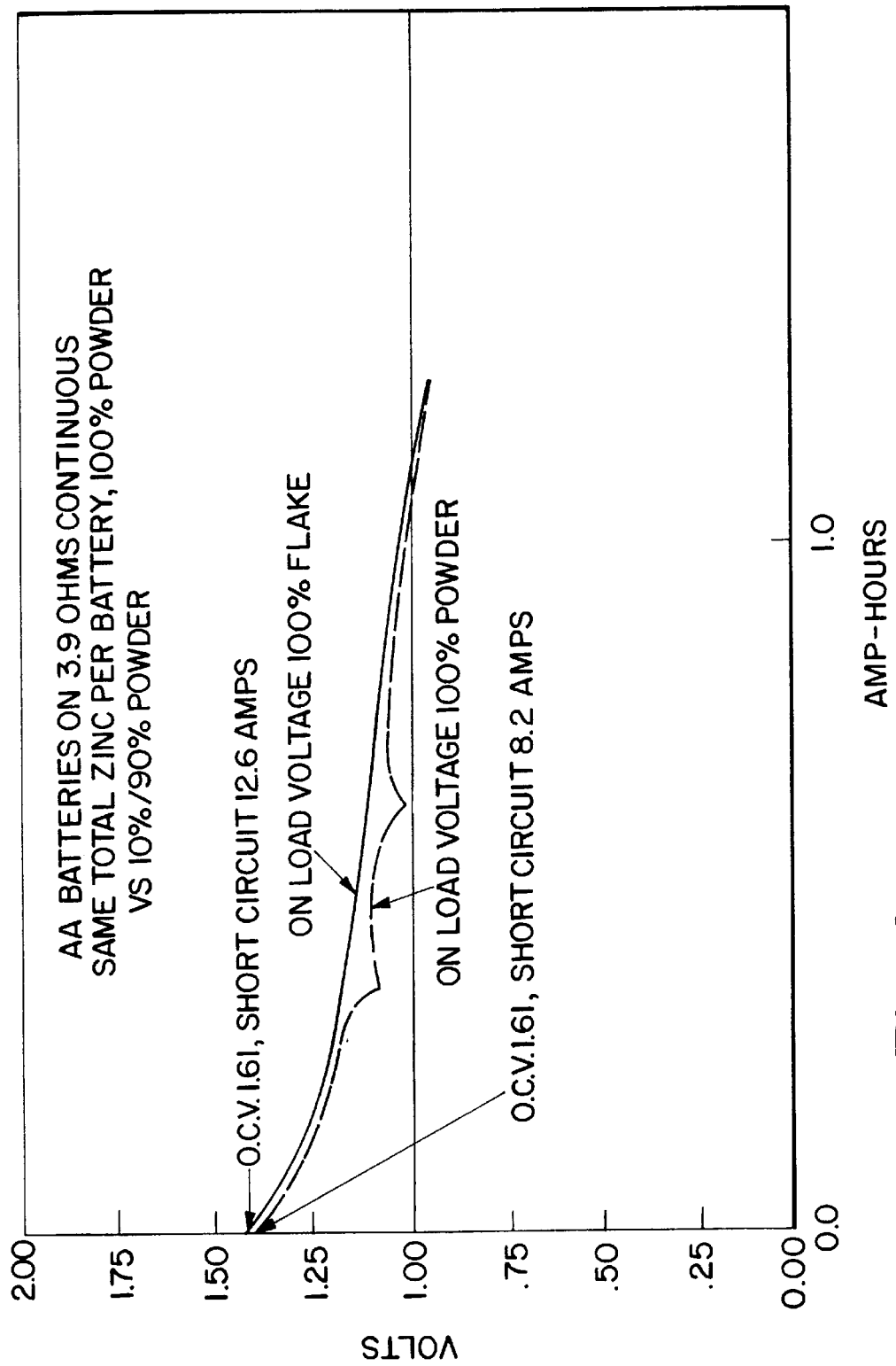
FIG. 4 is a plot of a voltage profile of a 3.9 ohm continuous discharge test comparing cells comprising an anode of conventional zinc powder to cells comprising an anode with 10 percent of the zinc as flakes with the remainder as powder.

In this example, zinc flakes of average flattened dimension 0.024×0.024×0.001 inch are combined with conventional zinc powder in gelled electrolyte, as described above in Example 1. The total amount of zinc in the gel is 63 weight percent, which is equivalent to 25.2 volume percent. Of this total amount of zinc, 10% by volume of this zinc is comprised of trough-shaped zinc flakes, the remainder being zinc powder. The resulting cells are discharged continuously at 3.9 ohms load. As shown in FIG. 4, the cells with the zinc flakes have higher short circuit amperages than the controls, and smooth discharge curves compared to erratic discharge for the controls. This demonstrates that with the flakes, there is better electron conductivity. The cells with the flakes also have 90 more minutes of discharge to the sudden decrease in voltage, due to the higher total zinc surface area of the cell with zinc flakes.

EXAMPLE 3

In this example, zinc gel anodes containing a total of 9 volume percent zinc, all in the form of flakes, is incorporated into AA cells. Control AA cells contained 28.3 volume percent zinc, all in the form of powder. The flake and control AA cells are tested for operating voltage performance on a 1.8 Ω IEC Pulse test in which a 1.8 Ω load is alternately connected to the cell terminals for 15 seconds and disconnected for 45 seconds. The results show that, during the useful life of the cells—defined as the period during which the cells maintained a voltage above 0.9 Volts—the flake AA cells maintain an average operating voltage of approximately 1.09 Volts, with the control cells at about 0.965 Volts. Thus, with less than one-third the volume of zinc, the flake anode cells maintain approximately 13% more voltage than the control cells during their useful life, clearly outperforming the controls, yet with markedly increased efficiency.

EXAMPLE 4

Figure 3:
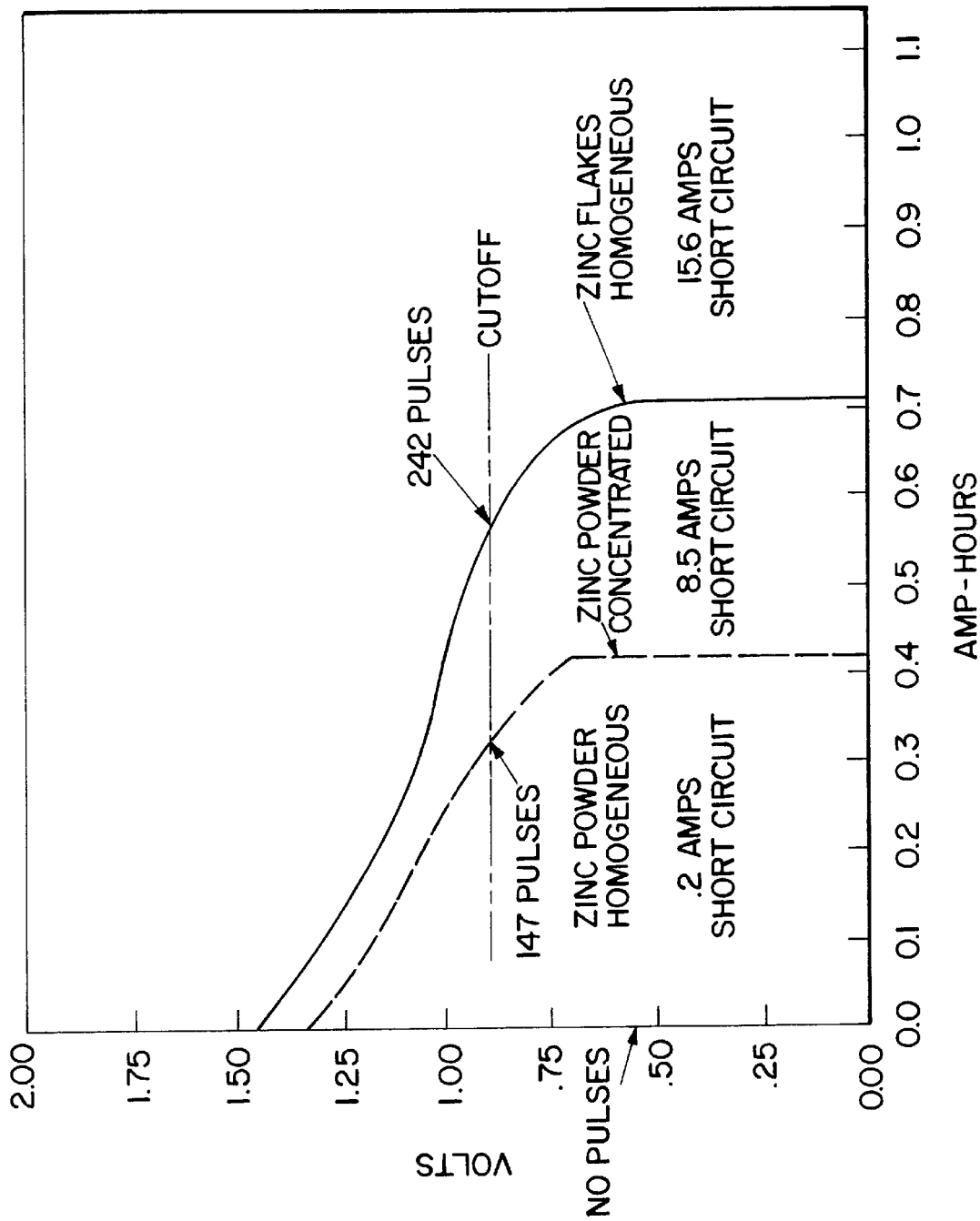
FIG. 3 is a plot of a voltage profile (voltage vs. amp-hr per gram zinc) of an IEC pulse test to 0.9 volts series comparing cells containing anodes employing zinc powder to an anode employing zinc flakes.
Figure 6C:
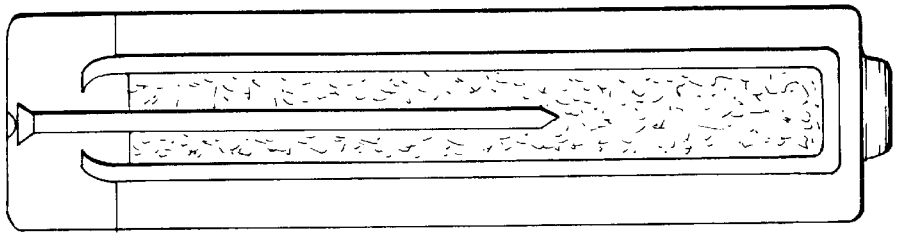
FIG. 6 shows cross-sections of alkaline manganese dioxide-zinc cells, illustrating a homogeneously dispersed zinc powder anodes, a concentrated zinc powder anode, and a homogeneously dispersed zinc flake anode.
Figure 6B:
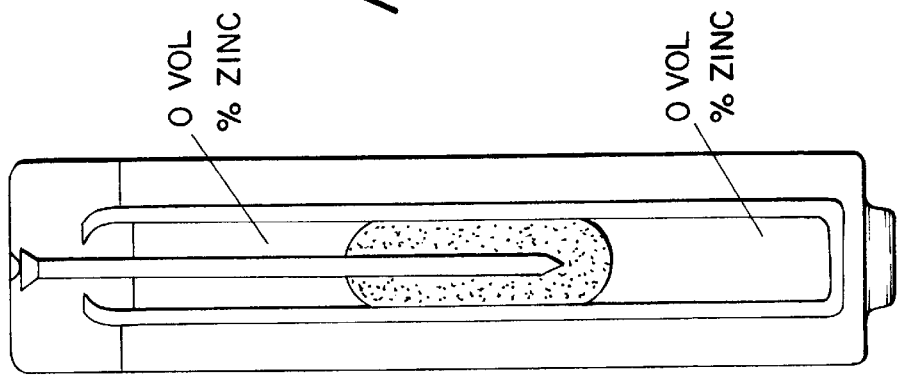
Figure 6A:
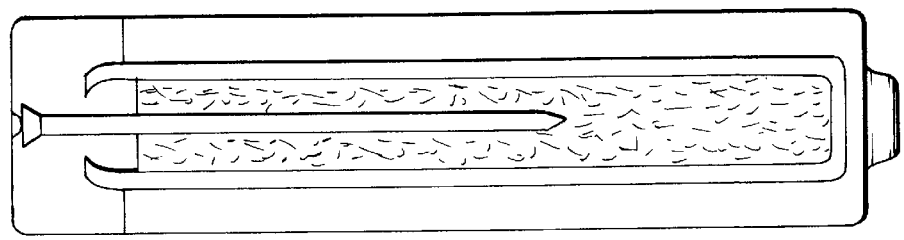

FIG. 3 is a graph comparing cells having 9 volume percent conventional zinc powder, 9 volume percent concentrated zinc powder, and 9 volume percent zinc flakes. A zinc anode gel having 9 volume percent zinc as only conventional zinc powder (Big River Zinc 1230) is prepared by homogeneously mixing the indium coated zinc powder with the pregelled electrolyte solution, and incorporating into a AA size cylindrical alkaline cell. This first cell is depicted schematically in FIG. 6A. A second zinc anode gel having 9 volume percent zinc as only conventional zinc powder (Big River Zinc 1230) is prepared by mixing the indium-coated zinc powder with the pregelled electrolyte solution, then incorporating the anode gel into a AA size cylindrical alkaline cell, concentrated to 25 volume percent near the collector for electrical contact. This second cell is depicted schematically in FIG. 6B. A third anode gel having 9 volume percent zinc, entirely as zinc flakes, is prepared by homogeneously mixing the zinc flakes with the pregelled electrolyte solution. This third cell is depicted schematically in FIG. 6C. The construction of these three cells are illustrated by the three cell constructions depicted in FIG. 6. Open circuit voltages and short circuit amperages are measured on the three types. All three types have the same open circuit voltage, but a large difference in amperages: 0.2 amperes for the homogeneous powder, 8.5 amperes for the concentrated powder, and 15.6 for the homogeneous zinc flakes. The test is a high rate pulse for these cells, consisting of 1.8 ohms, 15 seconds on and 45 seconds off, at 21° C. to a cutoff of 0.90 volts.

The cell having the homogeneously dispersed powder was below cutoff on the first pulse, as indicated by the dot-dash curve. The cell having the zinc powder concentrated exhibits 147 pulses to the cutoff as shown by the dash curve. The cell having the homogeneously dispersed zinc flakes exhibits 242 pulses to the cutoff voltage, as shown by the solid line curve. These results evidence that zinc flakes provide better performance than the powder, even when the zinc powder has been concentrated to offset the poorer particle to particle electrical matrix compared to the flake.

EXAMPLE 5

Figure 5:
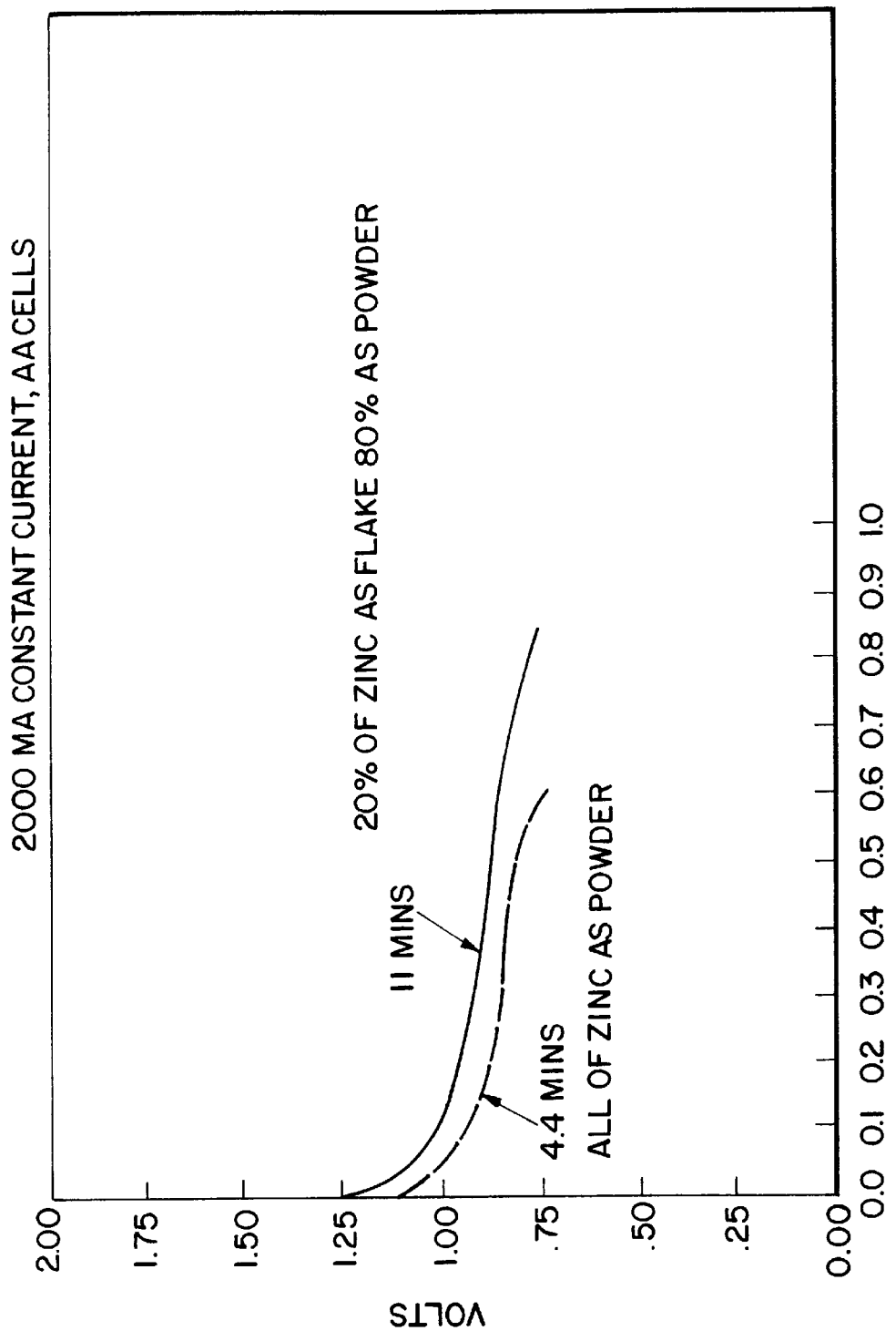
FIG. 5 is a plot of a voltage profile (voltage vs. amp-hr per gram zinc) of a 2000 milliamp test to 0.9 volts of cells employing an anode of all zinc powder to an anode of 20% by weight flakes and the remainder zinc powder.

FIG. 5 is a graph comparing the performance results of two alkaline cells, having 25 volume percent zinc, at a constant current drain of 2000 milliamps for AA size cylindrical alkaline cells. One cell was a control, having all the zinc as zinc powder, and the other cell substituted 20 weight percent of the powder with 0.024×0.024×0.001 inch zinc flakes. The test is 2000 Milliamperes constant current in a 21° C. room to 0.90 can be seen by the voltage profiles, the cell having all the zinc as powder exhibits 4.4 minutes to 0.90 volts while the one with 20% of the zinc as the square flakes exhibits 11.0 minutes to 0.90 volts. Employing the zinc flakes thus shows a significant improvement on high rate discharge.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. An electrochemical cell comprising an anode comprising non-compacted zinc flakes.
2. The electrochemical cell in claim 1, wherein said anode further comprises zinc powder.
3. The electrochemical cell in claim 1, wherein said zinc flakes having an average surface area of about 75 cm$^2$ to about 150 cm$^2$ per gram.
4. The electrochemical cell in claim 2, wherein said zinc flakes comprise from about 5 to about 70 weight percent of the total combined weight of the zinc flakes and the zinc powder.
5. The electrochemical cell in claim 2 wherein said zinc flakes comprise between about 5 and 30 weight percent of the total combined weight of the zinc flakes and the zinc powder.
6. The electrochenical cell in claim 1, wherein said zinc flakes comprise pure zinc.
7. The electrochemical cell in claim 1, wherein said zinc flakes comprise a zinc alloy.
8. The electrochemical cell in claim 7, wherein said zinc alloy comprises one or more of the metals selected from the group consisting of indium, lead, bismuth, lithium, calcium, aluminum.
9. The electrochemical cell in claim 1, wherein said zinc flakes are coated or surface deposited with indium.
10. The electrochemical cell in claim 2 wherein said zinc powders are coated or surface deposited with indium.
11. The electrochemical cell of claim 1, said electrochemical cell comprising an alkline electrolyte.
12. The electrochemical cell of claim 1 wherein said zinc flakes have thickness, length, width, and span dimensions, said thickness dimension being at least 10 times smaller than its length and span and width dimensions.
13. The electrochemical cell in claim 12 wherein said thickness is at least 10 times smaller than said length dimension.
14. The electrochemical cell in claim 12 wherein said thickness is at least 10 times smaller than said span dimension.
15. The electrochemical cell in claim 12 wherein said thickness is at least 10 times smaller than said width dimension.
16. The electrochemical cell in claim 2 wherein said zinc flakes comprise from about 5 to about 70 weight percent of the total combined weight of the zinc flakes and the zinc powder.
17. The electrochemical cell in claim 2 wherein said zinc flakes comprise from about 5 to about 30 weight percent of the total combined weight of the zinc flakes and the zinc powder.
18. The electrochemical cell of claim 1, wherein the zinc flakes are uniformly incorporated within the anode.
19. The electrochemical cell of claim 1, wherein said zinc flakes are homogenously dispersed within the anode.
20. The electrochemical cell of claim 1, wherein said anode comprises a zinc concentration less than 28 percent by volume.
21. The electrochemical cell of claim 1, wherein said cell comprises a "AA" size alkaline cell, wherein said electrochemical cell demonstrates at least 10 minutes of 2000 milliampere constant current in a 21° C. room to 0.90 volts.

* * * * *